(12) United States Patent
Jamison et al.

(10) Patent No.: US 11,927,062 B2
(45) Date of Patent: Mar. 12, 2024

(54) METHODS OF MANUFACTURING LOST CIRCULATION MATERIAL AT A WELL SITE

(71) Applicant: Halliburton Energy Services, Inc., Houston, TX (US)

(72) Inventors: Dale E. Jamison, Humble, TX (US); William Walter Shumway, Spring, TX (US); Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/016,397

(22) PCT Filed: Dec. 15, 2020

(86) PCT No.: PCT/US2020/065104
§ 371 (c)(1),
(2) Date: Jan. 16, 2023

(87) PCT Pub. No.: WO2022/132133
PCT Pub. Date: Jun. 23, 2022

(65) Prior Publication Data
US 2023/0287745 A1 Sep. 14, 2023

(51) Int. Cl.
*E21B 21/06* (2006.01)
*C09K 8/506* (2006.01)
*E21B 33/138* (2006.01)

(52) U.S. Cl.
CPC ............ *E21B 21/062* (2013.01); *C09K 8/506* (2013.01); *E21B 33/138* (2013.01)

(58) Field of Classification Search
CPC ...... E21B 21/062; E21B 33/138; C09K 8/506
See application file for complete search history.

(56) References Cited

U.S. PATENT DOCUMENTS

| | | |
|---|---|---|
| 7,297,662 B2 | 11/2007 | Verret |
| 10,415,331 B2 | 9/2019 | Snoswell |

(Continued)

FOREIGN PATENT DOCUMENTS

| | | |
|---|---|---|
| CN | 105801930 A | 7/2016 |
| CN | 110358513 A | 10/2019 |

(Continued)

OTHER PUBLICATIONS

International Search Report and Written Opinion for PCT/US2020/065104 dated Sep. 2, 2021.

*Primary Examiner* — Silvana C Runyan
(74) *Attorney, Agent, or Firm* — Thomas Rooney; C. Tumey Law Group PLLC

(57) ABSTRACT

Methods for manufacturing lost circulation material particulates that may be for use in treating a subterranean formation are provided. In some embodiments, the methods include providing at a well-site a feed vessel that contains a liquid material, the liquid material including a monomer and an initiator; providing an injection device disposed underneath the feed vessel for directing at least a portion of the liquid material from the feed vessel to a reaction chamber, wherein the reaction chamber includes a fluid; discharging at least a portion of the liquid material from the feed vessel to the reaction chamber through an orifice disposed on the injection device; and forming LCM particulates at least in part by allowing at least a portion of the liquid material to polymerize in the fluid in the reaction chamber.

9 Claims, 3 Drawing Sheets

(56) References Cited

U.S. PATENT DOCUMENTS

| | | | |
|---|---|---|---|
| 10,865,620 B1* | 12/2020 | Ramasamy | E21B 41/00 |
| 2010/0044919 A1* | 2/2010 | Correia | B28B 13/062 |
| | | | 425/115 |
| 2015/0330215 A1* | 11/2015 | Jamison | E21B 49/08 |
| | | | 73/152.42 |
| 2016/0084022 A1 | 3/2016 | Snoswell | |
| 2016/0200967 A1 | 7/2016 | Mahoney et al. | |
| 2016/0369627 A1* | 12/2016 | Kulkarni | E21B 49/005 |
| 2020/0368967 A1 | 11/2020 | Zhan et al. | |

FOREIGN PATENT DOCUMENTS

| | | |
|---|---|---|
| EP | 3052749 B1 | 5/2019 |
| RU | 2259469 C1 | 8/2005 |
| WO | 2017070406 A1 | 4/2017 |

* cited by examiner

METHODS OF MANUFACTURING LOST CIRCULATION MATERIAL AT A WELL SITE

BACKGROUND

The present disclosure relates to methods for treating subterranean formations, and more specifically, relates to methods for manufacturing lost circulation material ("LCM") particulates for use in treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a treatment fluid may be used to drill a wellbore in a subterranean formation or to complete a wellbore in a subterranean formation, as well as numerous other purposes.

A drilling fluid, or "mud," is a treatment fluid that is circulated in a wellbore as the wellbore is being drilled to facilitate the drilling operation. The various functions of a drilling fluid may include, but are not limited to, removing drill cuttings from the wellbore, cooling and lubricating the drill bit, aiding in support of the drill pipe and drill bit, and providing a hydrostatic head to maintain the integrity of the wellbore walls and prevent well blowouts.

During drilling, fracturing, or other treatment of subterranean formations, the drilling fluid being circulated through the wellbore may be lost into the surrounding formation. Fluids are typically lost into the formation through fractures induced by excessive mud pressures, pre-existing open fractures, or large openings with structural strength in the formation (i.e., "loss zones"). In addition to potential underground blowouts, cross flow, and loss of hydrostatic pressure, lost circulation can lead to a drill pipe becoming lodged in the wellbore. In some instances where these phenomena occur, drilling may need to be terminated to allow for a remedial operation to be performed.

In some drilling operations when lost circulation is observed, LCM particulates may be added to drilling fluids for plugging the portion of formation through which the fluids are being lost. A variety of LCM particulates have been used or proposed for arresting lost circulation of drilling fluids. However, in some instances, traditional LCM particulates may be too large to bypass components or pieces of equipment associated with the preparation, delivery, recapture, recycling, reuse, and/or disposal of the LCM particulates (e.g., shaker screens) or too small to effectively reduce or prevent lost circulation. Moreover, the typical transportation and storage of traditional LCM particulates at a well-site may be a time-consuming and expensive endeavor.

BRIEF DESCRIPTION OF THE DRAWINGS

These drawings illustrate certain aspects of some of the embodiments of the present disclosure and should not be used to limit or define the claims.

Figure 1:
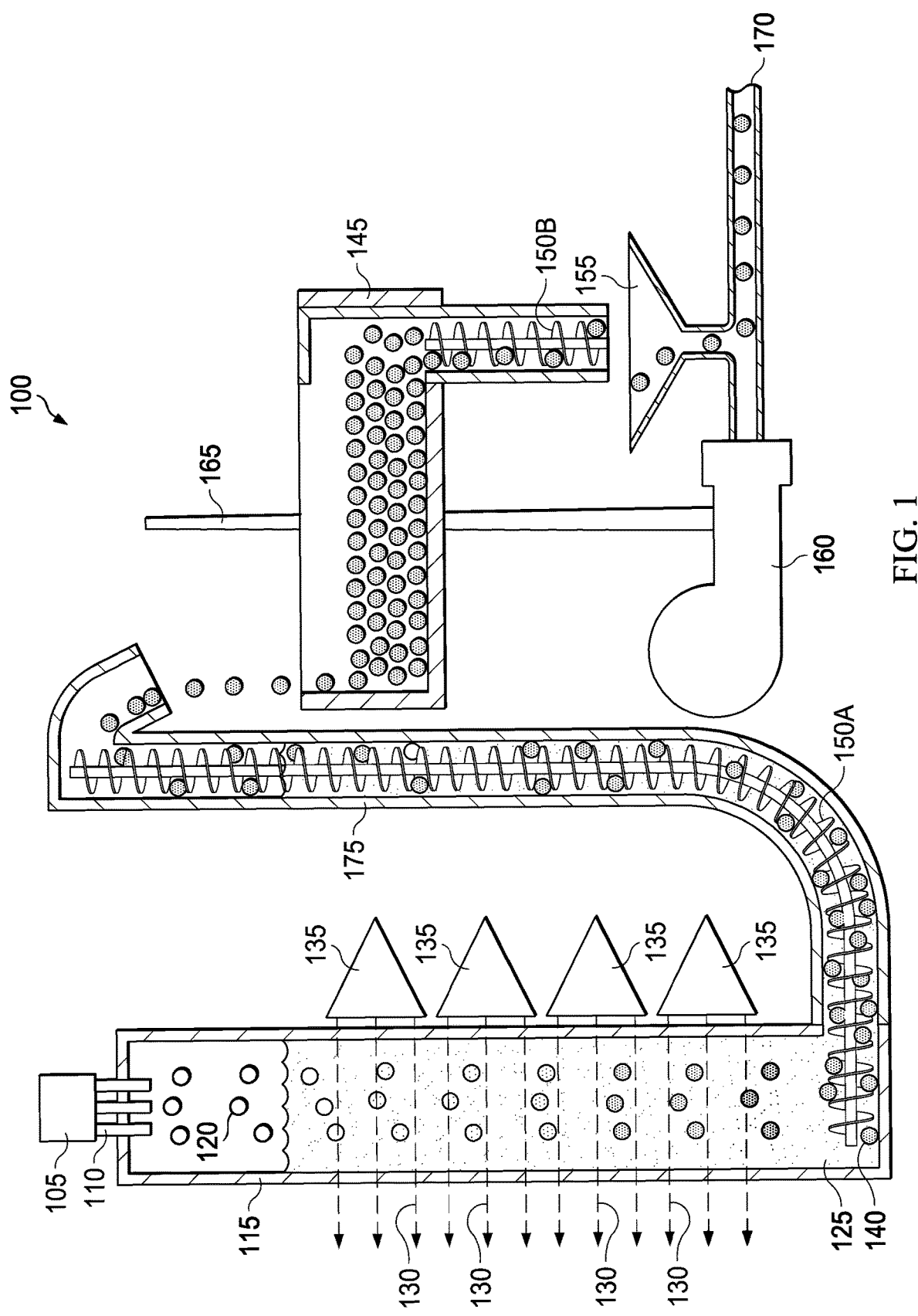
FIG. 1 is a perspective schematic view of a falling droplet system in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "cure," "cured," "curing," and grammatical equivalents thereof refer to the process of a liquid material transitioning to a harder or more solid material. For example, in certain embodiments, a fluid may be considered "cured" when the shear storage modulus is greater than the shear loss modulus of the fluid. In certain embodiments, a fluid may be considered "cured" or at least partially cured when it forms a gel.

The present disclosure relates to methods for treating subterranean formations. More particularly, the present disclosure relates to methods for manufacturing lost circulation material ("LCM") particulates for use in treating subterranean formations. The methods of the present disclosure generally include: providing at a well-site a feed vessel that contains a liquid material, the liquid material including a monomer and an initiator; providing an injection device disposed underneath the feed vessel for directing at least a portion of the liquid material from the feed vessel to a reaction chamber, wherein the reaction chamber includes a fluid; discharging at least a portion of the liquid material from the feed vessel to the reaction chamber through an orifice disposed on the injection device; and forming LCM particulates at least in part by allowing at least a portion of the liquid material to polymerize in the fluid in the reaction chamber. In some embodiments, the methods of the present disclosure may provide a radiation light source or a heat source, inter alia, to initiate polymerization of the liquid material. In some embodiments, the methods of the present disclosure may include a moving belt in lieu of a reaction chamber to facilitate the manufacturing of LCM particulates.

Among the many potential advantages to the methods of the present disclosure, only some of which are alluded to herein, the methods of the present disclosure may, in some embodiments, facilitate the preparation of LCM particulates at a well site, which may eliminate the need to transport LCM particulates to the well site and/or to use specialized totes for storing or transporting LCM particulates. For example, in some embodiments, the methods of the present disclosure may be used to manufacture LCM particulates in or near real-time using liquid source materials at the well site. As such, the preparation of LCM particulates may be conducted as various needs arise and may be tailored to those needs. Moreover, the direct manufacturing of LCM particulates using liquid source materials at the well site may facilitate optimum wellbore strengthening while also reducing the amount of LCM particulates required, thus minimizing waste and density build up in a treatment fluid. In certain embodiments, the LCM particulates of the present disclosure may provide an enhanced ability to plug a loss zone by being manufactured with specific properties based upon real-time operational knowledge. For instance, in some embodiments, the disclosed LCM particulates may include a range of thermal and mechanical properties, such as particle size distribution, thermal conductivity, density, hardness, toughness, and modulus of elasticity. Accordingly, the methods of the present disclosure may provide LCM particulates using liquid source materials at the well site, which in turn may reduce or eliminate problems associated with the procurement of LCM particulates, as well as provide LCM particulates with desired properties tailormade for real-time operations.

The LCM particulates of the present disclosure may be used in a variety of applications and environments in which plugging a loss zone may be desired. Examples of applications suitable for certain embodiments of the present disclosure may include, but are not limited to use in subterranean formations, and/or downhole applications (e.g., drilling, fracturing, completions, oil production). In certain embodiments, LCM particulates may be applicable to injection wells, monitoring wells, and/or production wells, including hydrocarbon or geothermal wells and wellbores. In other embodiments, the LCM particulates may be introduced into a subterranean formation, for example, using a wellbore penetrating at least a portion of a subterranean formation.

In certain embodiments, the LCM particulates of the present disclosure may be added to a treatment fluid. Depending on the type of treatment to be performed, the treatment fluid may include any treatment fluid known in the art. Treatment fluids that may be useful in accordance with the present disclosure include, but are not limited to, drilling fluids, cement fluids, lost circulation fluids, stimulation fluids (e.g., fracturing fluids or acid stimulation fluids), completion fluids, conformance fluids (e.g., water or gas shutoff fluids), sand control fluids (e.g., formation or proppant consolidating fluids), workover fluids, and/or any combination thereof.

In certain embodiments, the LCM particulates of the present disclosure may include a plurality of LCM particulates. As described herein, the terms "particles" and "particulates" may encompass a single type of particle and/or mixtures of types of particles. As described herein, the term "type of particle" may indicate particles that are differentiated from other particles, for example, by composition, shape, size, and/or particle size distribution.

The LCM particulates of the present disclosure may be formed via polymerization. For example, in certain embodiments, the methods of the present disclosure may use photoinitiators and monomers, which, upon exposure to ultraviolet ("UV") light, may undergo photopolymerization to form particulates. Specifically, the photoinitiators may absorb certain wavelengths of light and react to create reactive species to initiate polymerization in the presence of the monomer. Accordingly, the photopolymerization may result in a curing process that transforms those materials to a more solidified state. Alternatively, the methods of the present disclosure may use thermal initiators and monomers, which, upon exposure to thermal energy, may undergo thermal polymerization. In particular, the thermal initiators may generate radicals or cations upon exposure to thermal energy that lead to polymerization of the monomer, resulting in the curing of LCM particulates. In other embodiments, the materials used in the methods of the present disclosure may undergo polymerization through any other known polymerizing step, which in turn may lead to an increase in viscosity and/or cause solid-state mechanical properties to develop (e.g., stiffness, toughness, and the like).

Turning now to the drawings, a method in accordance with the present disclosure will now be described. FIG. 1 is a perspective schematic view of a falling droplet system 100 in accordance with the present disclosure. The falling droplet system 100 may include a feed vessel 105 that may hold various fluids. The feed vessel 105 may be made of any metal, plastic, or other material that allows the feed vessel 105 to hold the liquid material. The feed vessel 105 may include an injection device 110 that is connected to and extends downward from the feed vessel 105 to dispense the liquid material from the feed vessel 105 to a reaction chamber 115. The liquid material may descend as uncured LCM droplets 120 into the reaction chamber 115, which contains a fluid 125 that slows the settling time of the uncured LCM droplets 120. As the uncured LCM droplets 120 travel downwards (due at least in part to gravity) through the fluid 125, they may be exposed to UV light 130 provided by a radiation light source 135 in order to initiate photopolymerization. The uncured LCM droplets 120 may undergo photopolymerization and become cured LCM particulates 140 at least by the time they reach the bottom of the reaction chamber 115. The reaction chamber 115 may be made of any metal, plastic, or other material to allow for the photopolymerization of the uncured LCM droplets 120.

In some embodiments, the radiation light source 135 may include any radiation source suitable for use in the reaction chamber 115, including, but not limited to, UV light 130, sunlight, artificial light, and the like. Mercury, xenon, and tungsten lamps are examples of suitable radiation light sources 135. In some embodiments, UV light 130 of any wavelength may be suitable. For example, in some embodiments, the UV light 130 may include a wavelength from about 10 nanometers ("nm") to about 400 nm. In certain embodiments, a specific range of UV light 130 may be suitable. For instance, UV light 130 is classified into three wavelength ranges: UV-C, from about 200 nm to about 280 nm; UV-B, from about 280 nm to about 315 nm; and UV-A, from about 315 nm to about 400 nm. Accordingly, in some embodiments, one or more of the UV-A, UV-B, and UV-C wavelength ranges may be suitable for use with the present disclosure.

After exposure to the UV light 130, the cured LCM particulates 140 are discharged from the falling droplet system 100. Specifically, the cured LCM particulates 140 are transferred from the bottom of the reaction chamber 115 to a storage vessel 145 through a conduit 175 using a transporting mechanism 150A. In the storage vessel 145, the cured LCM particulates 140 are collected and dried before being transferred to a hopper 155 using a transporting mechanism 150B. From the hopper 155, the cured LCM particulates 140 are mixed into a mud system using a mud pump 160 coupled to a mud pit 165 before being transferred to a discharge end 170 for transferring the cured LCM particulates 140 to a downstream location.

Various arrangements of the components in the falling droplet system 100 may be used and controlled to provide the flow of LCM from the feed vessel 105 to the discharge end 170. This allows the falling droplet system 100 to provide any desired size, shape, quantity, or other property of the cured LCM particulates 140. In some embodiments, the feed vessel 105 may include an injection device 110 that directs the liquid material from the feed vessel 105 to the reaction chamber 115. The injection device 110 may include orifices of a variety of sizes, inter alia, to produce any size of the uncured LCM droplets 120. For example, in certain embodiments, the injection device 110 may have an orifice diameter in the range of from about 0.05 to about 2 millimeters ("mm"). In some embodiments, the injection device 110 may have an orifice diameter in the range of from about 0.1 to about 1 mm. In other embodiments, the injection device 110 may have an orifice diameter in the range of from about 0.1 to about 0.5 mm.

The cured LCM particulates 140 may be of any size suitable for a particular operation of interest. In some embodiments, the cured LCM particulates 140 may have a diameter of about 2,000 micrometers ("μm") or smaller, about 1,700 μm or smaller, or about 1,500 μm or smaller, about 1,200 μm or smaller, about 900 μm or smaller. In some embodiments, the cured LCM particulates 140 may have a diameter of from about 1 μm to about 2,000 μm. In certain embodiments, the cured LCM particulates 140 may exhibit a particle size distribution between about 1 μm and about 2,000 μm. As used herein the term, particle size distribution refers to a list of values or a mathematical function that defines the relative amount by volume of particles present within a fluid according to size. For example, in some embodiments, the cured LCM particulates 140 may have a d50 particle size distribution of from about 25 μm to about 1,000 μm. In certain embodiments, the cured LCM particulates 140 may exhibit a d50 particle size distribution of 1,000 μm or smaller, 750 μm or smaller, 500 μm or smaller, 250 μm or smaller, 100 μm or smaller, or 50 μm or smaller.

In some embodiments, the cured LCM particulates 140 may be manufactured at any suitable rate, which may be adjusted based on a number of factors, including but not limited to the supply of liquid material, the demand of cured LCM particulates 140, the potential storage capacity, and/or the operating conditions at the well site. The rate of manufacturing the cured LCM particulates 140 may vary accordingly to meet the desired demands and/or purposes of the present disclosure. For example, in certain embodiments, the rate of manufacturing the cured LCM particulates 140 may range from about 1 to about 500 pounds per minute ("lbs/min"). In some embodiments, the rate of manufacturing the cured LCM particulates 140 may range from about 1 to about 250 lbs/min. In other embodiments, the rate of manufacturing the cured LCM particulates 140 may range from about 1 to about 100 lbs/min.

In some embodiments, the fluid 125 contained within the reaction chamber 115 may impact one or more properties of the cured LCM particulates 140. For example, in some embodiments, the fluid 125 contained within the reaction chamber 115 may impact the shape or sphericity of the cured LCM particulates 140 based upon their descending rate in the reaction chamber 115, which may be impacted by the nature and/or properties of the fluid 125. Examples of the fluid 125 contained within the reaction chamber 115 may include, but is not limited to, a gas such as air, an aqueous liquid such as water, a non-aqueous liquid such as liquid hydrocarbon, a liquified gas, and any other type of suitable fluid to achieve the goals of the present disclosure. In certain embodiments, the fluid 125 contained within the reaction chamber 115 may include a mixture of the one or more aforementioned liquids and/or gases.

In some embodiments, the cured LCM particulates 140 are transferred from the bottom of the reaction chamber 115 to a storage vessel 145 using a transporting mechanism 150A. The reaction chamber 115 connects to a conduit 175 that connects to the storage vessel 145. The conduit 175 may be any pipe or hose through which the cured LCM particulates 140 may flow from the reaction chamber 115 to the storage vessel 145. As illustrated, the conduit 175 may include the transporting mechanism 150A such as an auger or sand screw designed to move the cured LCM particulates 140 from the reaction chamber 115 into the storage vessel 145. Rotation of the auger may be controlled to transport the cured LCM particulates 140 into the storage vessel 145 in a metered fashion, in order to maintain a desired amount of the LCM particulate entering the storage vessel 145. It should be noted that other mechanical and/or pneumatic conveying devices may be used in other embodiments to deliver the cured LCM particulates 140 in a metered fashion to the storage vessel 145. Similarly, the transporting mechanism 150B may be any type of mechanical and/or pneumatic conveying device to direct the cured LCM particulates 140 as required for the purposes of the present disclosure.

Figure 2:
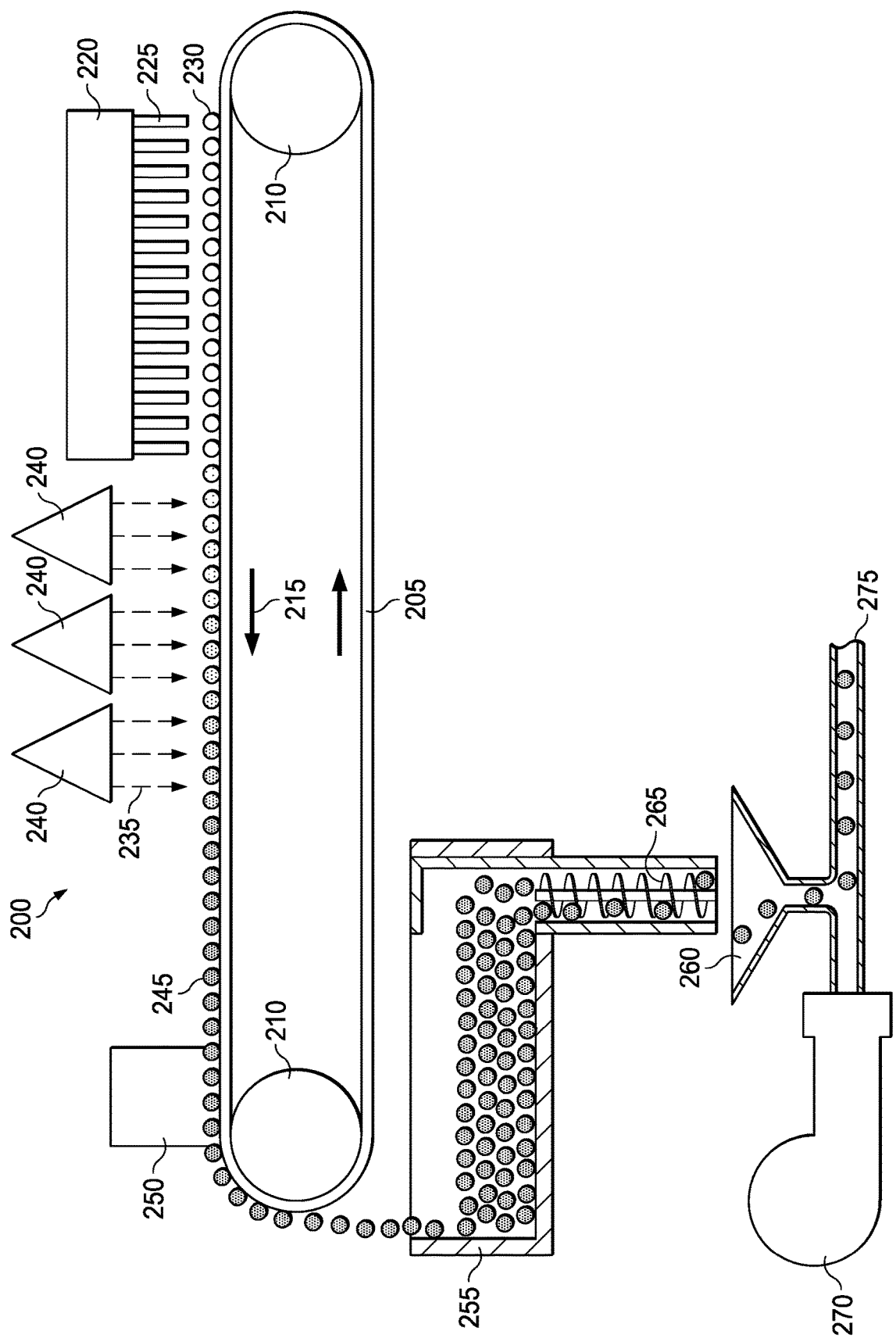
FIG. 2 is a perspective schematic view of a conveyer belt system in accordance with certain embodiments of the present disclosure.

Besides the falling droplet system 100, the methods of manufacturing the LCM particulates of the present disclosure may have other configurations. For example, FIG. 2 is a perspective schematic view of a conveyer belt system 200 in accordance with the present disclosure. Many of the characteristics in the falling droplet system 100, such as the rate of manufacturing LCM particulates, the UV light, the radiation light source, the orifice diameter of the injection device, the transporting mechanisms, the properties of the LCM particulates, and other features, are the same as those disclosed in the conveyer belt system 200. As illustrated, the conveyer belt system 200 may include a belt 205 moving over rollers 210 in the direction indicated by the arrows 215. Disposed above the belt 205 is a feed vessel 220 that holds liquid material. The feed vessel 220 may include an injection device 225 that is connected to and extends downward from the feed vessel 220 to dispense uncured LCM droplets 230 from the feed vessel 220 to an exposed surface of the belt 205. As the belt 205 travels around the rollers 210, the uncured LCM droplets 230 may be exposed to UV light 235 provided by a radiation light source 240 in order to initiate photopolymerization. Accordingly, the uncured LCM droplets 230 may undergo photopolymerization and become cured LCM particulates 245 at least by the time they reach a detaching device 250. The detaching device 250 may loosen the cured LCM particulates 245 from the belt 205 so that they are discharged to a storage vessel 255. Similar to FIG. 1, the cured LCM particulates 245 may be collected and dried before being transferred to a hopper 260 using a transporting mechanism 265. From the hopper 260, the cured LCM particulates 245 are mixed into a mud system using a mud pump 270 coupled to a mud pit (not shown) before being transferred to a discharge end 275 for transferring the cured LCM particulates 245 to a downstream location.

In some embodiments, the belt 205 may be made from any elastomer, flexible material, or metal that is suitable for use according to the present disclosure. For example, in some embodiments, the belt 205 may be made from suitable elastomers that include, but are not limited to, nitrile butadiene which is a copolymer of acrylonitrile and butadiene, carboxylated acrylonitrile butadiene, hydrogenated acrylonitrile butadiene which is commonly referred to as highly saturated nitrile, carboxylated hydrogenated acrylonitrile butadiene, hydrogenated carboxylated acrylonitrile butadiene, ethylene, propylene, tetrafluoroethylene, fluorocarbon, perfluoroelastomer, and the like. In some embodiments, the belt 205 may be made from any type of metal using, for example, chain-linked metal plates or thin metal belts. It is within the ability of one skilled in the art, with the benefit of this disclosure, to select any suitable elastomer, flexible material, or metal for use in embodiments of the present disclosure.

In certain embodiments, the belt 205 optionally may be coated (not shown) with a material so that the cured LCM particulates 245 do not adhere, or adhere less strongly, to the belt 205. In some embodiments, the belt 205 may be coated with a hydrophilic, a hydrophobic, or an oleophobic material such as a polymer spray, etc., among other reasons, to facilitate the separation of cured LCM particulates 245 from the belt 205. Examples of such coating materials may include, but are not limited to Teflon, polyethylene, polypropylene, manganese oxide polystyrene, zinc oxide polystyrene, precipitated calcium carbonate, carbon nanotubes, silica nano-coatings, silicone or silane variants, and the like. In some embodiments, the belt 205 material may be rendered hydrophilic, hydrophobic, or oleophobic based on its surface topography, which may be etched and/or modified using techniques such as chemical etching, laser scribing, laser engraving, etc. The type of optional coating and/or surface topography of the belt 205 may be selected based on a number of factors, including but not limited to the composition, size, or shape of the cured LCM particulates 245 to be removed from the belt 205. In certain embodiments, the coating may be applied to the belt 205 prior to the feed vessel 220 dispensing uncured LCM droplets 230 to the belt 205.

In some embodiments, the cured LCM particulates 245 may be scraped, scrubbed, or otherwise loosened from the belt 205 using a detaching device 250. Examples of a suitable detaching device 250 for certain embodiments of the present disclosure may include, but are not limited to any scrapers, brushes, air knifes, water streams, or other types of cutting devices. These suitable detaching devices 250 may mechanically size, cut, and/or chop the cured LCM particulates 245 at any angle to achieve a desired shape or size of particulate.

In some embodiments, the injection device 225 may dispense the uncured LCM droplets 230 from the feed vessel 220 to an exposed surface of the belt 205. Similar to the injection device 110 in the falling droplet system 100, the injection device 225 in the conveyer belt system 200 may possess a variety of orifice sizes in order to produce various sizes of the uncured LCM droplets 230. In addition, in certain embodiments, the injection device 225 may also move in any direction in order to dispense uncured LCM droplets 230 in complex shapes. For example, in some embodiments, the injection device 225 may move vertically and/or horizontally relative to the belt 205. Accordingly, the injection device 225 may deposit the uncured LCM droplets 230 in any morphology and/or shape. Additionally, in some embodiments, the speed of the belt 205 may increase or decrease to impact the morphologies and shapes of the uncured LCM droplets 230. As a result, the LCM particulates of the present disclosure may include particles of any suitable geometry, including, but not limited to beads, hollow beads, spheres, ovals, fibers, rods, pellets, platelets, disks, plates, ribbons, and the like, or any combination thereof.

In each of the embodiments of FIGS. 1 and 2, the falling droplet system 100 and the conveyer belt system 200 may utilize a control system for regulating the manufacturing of LCM particulates. For example, the control system may be used to collect, process, and display data regarding activities at the site (either automatically using sensors at the site or manually entered into the system), perform calculations using that data, as described above, and/or execute instructions to perform various functions at a site. The control system may include an information handling system, such as a programmable logic controller (PLC), a suitably programmed computer, etc. Any suitable processing application software package may be used by the control system to process the data in keeping with the principles of this disclosure.

The control system may be centralized or distributed and may include one or more computer systems. Each computer system may have at least a processor for executing instructions and a memory for storing instructions and other data related to the computer system and the LCM operations. A computer system may be one of a variety of devices having a processor and memory, including: a personal computer (laptop or desktop), a server, a workstation, a microcontroller, a microcomputer, a PLC, an integrated circuit, a mobile device such as a smartphone or personal data assistant, or any similar system. Although many of these devices combine a processor and a memory in a single assembly, the processor and memory may be distributed among several devices capable of communicating with each other.

The memory for storing instructions may be in any format or combination of memory formats known in the art and accessible, directly or indirectly, by the processor. The memory may be in the form of installation memory, such as an installation CD/DVD-ROM or USB "thumb" drive, system memory (i.e., RAM), or other forms of computer storage including mechanical hard drives, solid-state hard drives, optical discs, tape drives, flash memory, or secure digital cards. Depending on the type of memory used, the memory may be configured in a redundant array of independent disks or similar arrangement that provides redundancy or improved performance. Instructions executed by the processor may be stored in the memory as software, firmware, or any other format suitable for execution by the processor. The programs stored in memory may be created using any programming techniques and in any programming language. In one embodiment, the control system may perform one or more of a variety of functions including controlling dispensing equipment, collecting data from sensors, retrieving data from logs or look-up tables, performing calculations on the collected or retrieved data for analysis, monitoring the LCM operations, communicating data to other computers or control systems using a local network or the internet, and storing data in a database or other similar form of collected data.

An operator may access the control system through a graphical user interface (GUI) as presented to the operator on a display. The operator may start, stop, resume, and/or cancel the LCM operations by using the GUI. In one embodiment, the GUI may dynamically display data in real-time. The GUI may also display historical data, enabling an operator to review data collected earlier or during the LCM operations. The GUI may display graphs, charts, or other forms of data that may be manipulated or customized by a user or system administrator to emphasize particular data of interest.

The control system may be configured to issue alarms to personnel and equipment if the control system detects an abnormal condition. For example, the control system may issue an alarm if a sensor reading or a calculation result falls outside of a predetermined range of safe values. In response to the alarm, operators may manually modify LCM operations to resolve the abnormal condition. Alternatively, the control system may automatically respond to the alarm by entering into an alternate mode of operation directed to resolving the abnormal condition. If the abnormal condition is not removed after a certain period of time, worsens, or is sufficiently outside of normal operating conditions, the control system may send an emergency shutdown signal stopping certain pieces of equipment or halting LCM operations altogether.

Besides using similar control systems, the falling droplet system 100 and the conveyer belt system 200 may use the same or similar polymerization mechanisms and/or chemistries to manufacture LCM particulates. For example, in some embodiments, the LCM of the present disclosure may include a photoinitiator. Suitable photoinitiators may be activated by the entire spectrum of UV light and may be more active in the wavelength range of about 10 nm to about 400 nm. Without limiting the present disclosure to any particular theory or mechanism, some photoinitiators may undergo cleavage of a single bond and release free radicals. Each photoinitiator may have a life span that is unique to that photoinitiator. In some instances, the less stable the free radical formed from the photoinitiator the shorter half-life and life span it may have.

Examples of suitable photoinitiators for use in the present disclosure may include, but are not limited to, acetophenone, propiophenone, benzophenone, xanthone, thioxanthone, fluorenone, benzaldehyde, anthraquinone, carbazole, thioindigoid dyes, phosphine oxides, ketones, ketocoumarin, and any combination and derivative thereof. Some photoinitiators include, but are not limited to, benzoinethers, benzilketals, alpha-dialkoxyacetophenones, alpha-hydroxyalkylphenones, alpha-aminoalkylphenones, acylphosphineoxides, and any combination or derivative thereof. Other photoinitiators undergo a molecular reaction with a secondary molecule or co-initiator, which generates free radicals. Some additional photoinitiators include, but are not limited to, benzophenones, benzoamines, thioxanthones, thioamines, and any combination or derivative thereof.

In certain embodiments, the methods of the present disclosure may use photoinitiators in an amount such that the methods of the present disclosure may achieve a desired function and/or for a desired purpose for the LCM particulates. For example, in certain embodiments, the photoinitiators may be present in an amount sufficient to start photopolymerization of the liquid material. In certain embodiments, the photoinitiator may be present in an amount from about 0.1% to about 5% by weight of the liquid material. In some embodiments, the photoinitiator may be present in an amount from about 0.5% to about 3% by weight of the liquid material. In other embodiments, the photoinitiator may be present in an amount from about 0.75% to about 2% by weight of the liquid material.

In some embodiments, the LCM particulates of the present disclosure may include a monomer. The monomers of the present disclosure may bind to other molecules to form a polymer during photopolymerization. As used herein, unless the context otherwise requires, a "polymer" includes oligomers, homopolymers, copolymers, terpolymers, etc. Examples of suitable monomers for use in the present disclosure may include, but are not limited to, acrylics, polyesters, urethanes, epoxies, N-vinyl amides, vinyl esters, and any combination thereof. In certain embodiments, the monomer may be present in an amount sufficient to conduct photopolymerization of the liquid material. In certain embodiments, the monomer may be present in an amount from about 50% to about 99.9% by weight of the liquid material. In some embodiments, the monomer may be present in an amount from about 55% to about 99.5% by weight of the liquid material. In other embodiments, the monomer may be present in an amount from about 60% to about 99.25% by weight of the liquid material.

In some embodiments, the LCM particulates of the present disclosure may include a non-polymerizable additive. Examples of suitable non-polymerizable additives for use in the present disclosure may include, but are not limited to, calcium carbonate, calcium sulfate, silica, polypropylene, graphite, walnut shell, almond shell, oyster shell, and any combination thereof. In certain embodiments, the non-polymerizable additive may be present in an amount from about 0.1% to about 49.9% by weight of the liquid material. In some embodiments, the non-polymerizable additive may be present in an amount from about 0.1% to about 25% by weight of the liquid material. In other embodiments, the non-polymerizable additive may be present in an amount from about 0.1% to about 5% by weight of the liquid material.

In some embodiments, the manufacturing of the LCM particulates of the present disclosure may undergo thermal polymerization. For example, in some embodiments, the LCM of the present disclosure may include thermal initiators and monomers, which upon exposure to thermal energy, the LCM particulates may undergo thermal polymerization. The aforementioned methods of manufacturing LCM particulates remain the same except the radiation light source is replaced with a heat source. Examples of suitable heat sources may include radiant (IR), electrical, preheated gases or liquids, and the like. Examples of suitable thermal initiators for use in the present disclosure may include, but are not limited to, azo compounds such as 2,2'-azobis(isobutyronitrile) (AIBN), organic peroxides such as benzoyl peroxide (BPO), benzenesulfonic acid esters, and alkylsulfonium salts and among others.

In certain embodiments, the LCM particulates of the present disclosure may exhibit a substantially uniform particle size distribution or a multi-modal particle size distribution. As used herein, LCM particulates having a "substantially uniform particle size distribution" are materials in which the standard deviation of the particle sizes in a representative sample of the particles is within about 30% of the mean (number) particle size. As used herein, LCM particulates having a "multi-modal particle size distribution" are materials in which a significant number of particles are of a size an order of magnitude removed from the mean particle size. In certain embodiments, the LCM particulates may include a bimodal or trimodal particle size distribution. In some embodiments, the LCM particulates may be processed by mechanically sizing, cutting or, chopping the LCM particulates into particles using any suitable methodologies for such processes.

In some embodiments, the LCM particulates may have a particle size distribution appropriate to be retained by an American Petroleum Institute ("API") Screen Number ranging from about 30 to about 70. In some embodiments, the LCM particulates may have a particle size distribution appropriate to be retained by an API Screen Number ranging from about 40 to about 60. In some embodiments, the LCM particulates may have a particle size distribution appropriate to be retained by an API Screen Number ranging from about 20 to about 325.

In some embodiments, the LCM particulates may be added to or otherwise used in a treatment fluid in an amount of from about 1% to about 25% by weight of the treatment fluid (e.g., about 1%, about 5%, about 10%, about 15%, about 20%, about 25%, etc.). In some embodiments, the LCM particulates may be present in the treatment fluid in an amount of from about 1% to about 25% by weight of the treatment fluid. In some embodiments, the LCM particulates may be present in an amount of from about 10% to about 25% by weight of the treatment fluid. In some embodiments, the LCM particulates may be present in the treatment fluid in an amount of from about 1 pound per barrel (ppb) to about 100 ppb (e.g., to about 1 ppb, about 5 ppb, about 10 ppb, about 15 ppb, about 20 ppb, about 25 ppb, about 30 ppb, about 35 ppb, about 40 ppb, about 45 ppb, about 50 ppb, about 55 ppb, about 60 ppb, about 65 ppb, about 70 ppb, about 75 ppb, about 80 ppb, about 85 ppb, about 90 ppb, about 95 ppb, about 100 ppb, etc.). In some embodiments, the LCM particulates may be present in the treatment fluid in an amount of from about 10 ppb to about 40 ppb. In some embodiments, the LCM particulates may be present in an amount of from about 15 ppb to about 30 ppb.

The treatment fluids prepared according to the methods of the present disclosure may include any base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the methods of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. Examples of non-aqueous fluids that may be suitable for use in the methods of the present disclosure include, but are not limited to oils, hydrocarbons, organic liquids, and the like. One of ordinary skill in the art, with the benefit of this disclosure, will recognize when such density and/or pH adjustments are appropriate. In certain embodiments, the treatment fluids may include a mixture of one or more fluids and/or gases, including but not limited to emulsions, foams, and the like.

In certain embodiments, the treatment fluids prepared according to the methods of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, paraffin inhibitors, asphaltene inhibitors, gas hydrate inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the LCM and/or other components of the treatment fluid may be metered directly into a base fluid to form a treatment fluid. In certain embodiments, the base fluid may be mixed with the LCM and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, cementing operations, and drilling operations. In some embodiments, the treatment fluids of the present disclosure may be used in treating a portion of a subterranean formation, for example, in treating a fluid loss in at least a portion of a permeable subterranean formation. In certain embodiments, a treatment fluid may be introduced into a subterranean formation. In some embodiments, the treatment fluid may be introduced into a wellbore that penetrates a subterranean formation.

In some embodiments, the treatment fluid including an LCM of the present disclosure may be introduced into a wellbore or portion of a subterranean formation at a pressure sufficient to cause at least a portion of the treatment fluid to penetrate at least a portion of the subterranean formation, and the treatment fluid may be allowed to interact with the subterranean formation so as to plug or divert fluid from one or more loss zones in the subterranean formation. Introduction of the treatment fluid may in some of these embodiments be carried out at or above a pressure sufficient plug or divert a flow path of fluid from within a subterranean formation. In other embodiments, the treatment fluid may be introduced to divert a flow path of fluid from at least a portion of a fractured formation to reduce water/gas production in production wells (e.g., water and/or gas shutoff) or to provide profile modification in injection wells (e.g., conformance control treatment). In other embodiments, the treatment fluid may be introduced during cementing or drilling operations as a component of lost circulation control.

In certain embodiments, the treatment fluid including an LCM may be introduced into a subterranean formation in an effective amount for modifying the permeability of one or more loss zones in the subterranean formation. In certain embodiments, the treatment fluid may be introduced as a pill and pumped into at least a portion of a subterranean formation. In some embodiments, a squeeze pressure from the surface may cause the treatment fluid to lose fluid into the subterranean formation and the treatment fluid including the LCM to form a solid mass, which may divert a flow path of fluid from at least a portion of the one or more loss zones of the subterranean formation. As used herein, the term "solid mass" refers to compressed LCM particles. In certain embodiments, the solid mass may have a solid low permeability to water and/or other treatment fluids. In certain embodiments, the gel mass may create a barrier to the flow of water and/or other treatment fluids in the portion of the subterranean formation containing the treatment fluid.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related, and other constraints, which vary by implementation and from time to time. While a developer's efforts might be mixture and time-consuming, such efforts would be, nevertheless, a routine undertaking for those of ordinary skill the art having benefit of this disclosure.

Figure 3:
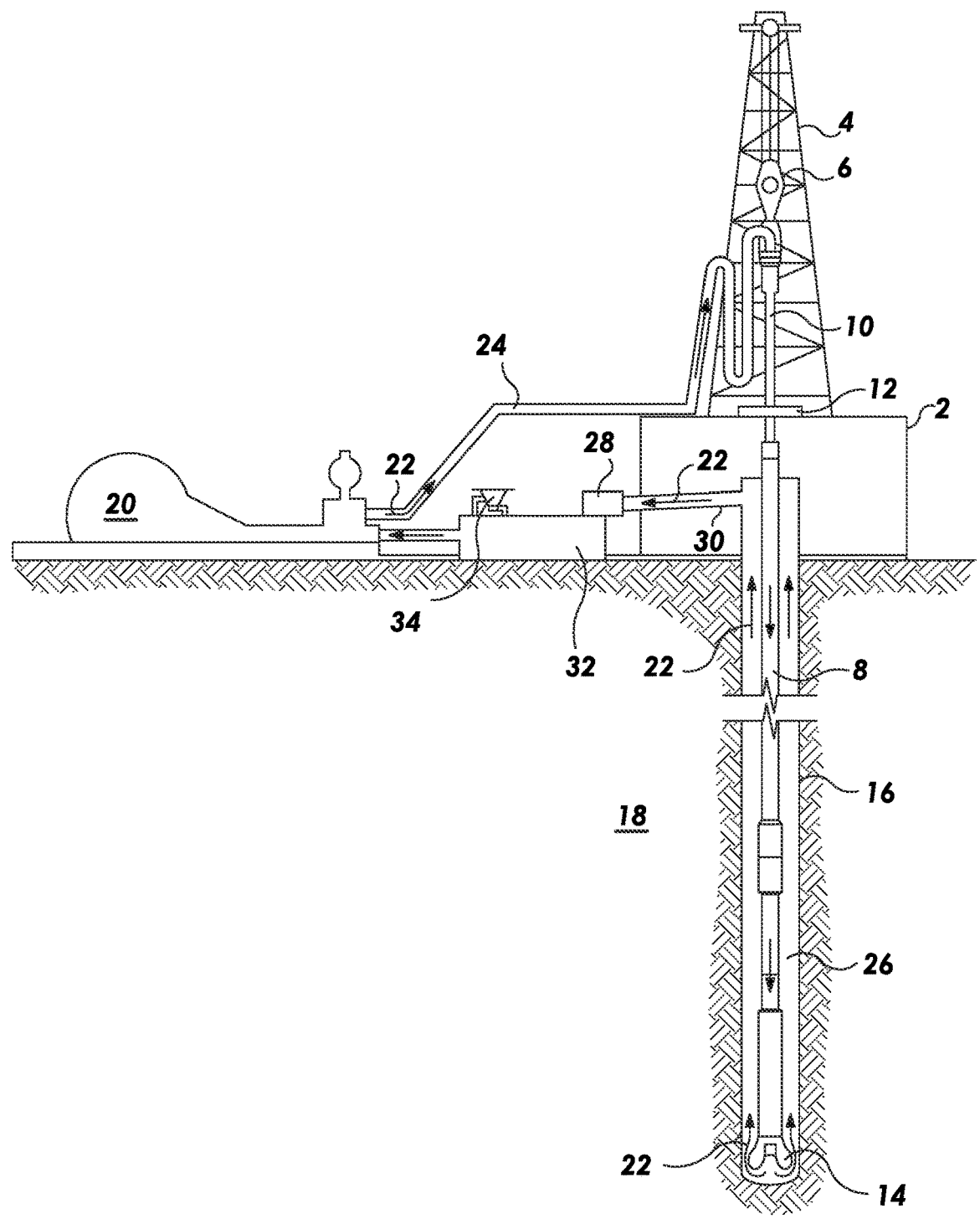
FIG. 3 is a schematic diagram of a system that may be used to deliver LCM particulates of the present disclosure to a downhole location in accordance with certain embodiments of the present disclosure.

Certain embodiments of the methods disclosed herein may directly or indirectly affect one or more components or pieces of equipment associated with the preparation, delivery, recapture, recycling, reuse, and/or disposal of the disclosed methods. For example, and with reference to FIG. 3, the systems and methods of the present disclosure may be associated with an exemplary wellbore drilling assembly 1, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure. In certain embodiments, the methods and systems of the present disclosure may be performed at the same location as the drilling assembly 1 of FIG. 3 or at a different location (e.g., a remote location).

As illustrated, the drilling assembly 1 may include a drilling platform 2 that supports a derrick 4 having a traveling block 6 for raising and lowering a drill string 8. The drill string 8 may include, but is not limited to, drill pipe and coiled tubing, as generally known to those skilled in the art. A kelly 10 supports the drill string 8 as it is lowered through a rotary table 12. A drill bit 14 is attached to the distal end of the drill string 8 and is driven either by a downhole motor and/or via rotation of the drill string 8 from the well surface. As the bit 14 rotates, it creates a wellbore 16 that penetrates various subterranean formations 18.

A pump 20 (e.g., a mud pump) circulates wellbore fluid 22 (e.g., a drilling fluid) through a feed pipe 24 and to the kelly 10, which conveys the wellbore fluid 22 downhole through the interior of the drill string 8 and through one or more orifices in the drill bit 14 (or optionally through a bypass or ports (not shown) along the drill string and above the drill bit 14). The wellbore fluid 22 is then circulated back to the surface via an annulus 26 defined between the drill string 8 and the walls of the wellbore 16. At the surface, the recirculated or spent wellbore fluid 22 exits the annulus 26 and may be conveyed to one or more fluid processing unit(s) 28 via an interconnecting flow line 30. In certain embodiments, the fluid processing unit(s) 28 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any additional fluid reclamation equipment. The fluid processing unit(s) 28 may further include one or more sensors, gauges, pumps, compressors, and the like. After passing through the fluid processing unit(s) 28, a "cleaned" wellbore fluid 22 may be recirculated through the feed pipe and/or deposited into one or more nearby retention pits 32 (e.g., a mud pit) for later re-use. While illustrated as being arranged at the outlet of the wellbore 16 via the annulus 26, those skilled in the art will readily appreciate that the fluid processing unit(s) 28 may be arranged at any other location in the drilling assembly 1 to facilitate its proper function, without departing from the scope of the scope of the disclosure.

Additives may be added to the wellbore fluid 22 via a mixing hopper 34 communicably coupled to or otherwise in fluid communication with the retention pit 32. The mixing hopper 34 may include, but is not limited to, mixers and related mixing equipment known to those skilled in the art. In other embodiments, however, additives may be added to the wellbore fluid 22 at any other location in the drilling assembly 1. In at least one embodiment, for example, there could be more than one retention pit 32, such as multiple retention pits 32 in series. Moreover, the retention pit 32 may be representative of one or more fluid storage facilities and/or units where the particles disclosed herein may be stored, reconditioned, and/or regulated until added to the wellbore fluid.

An embodiment of the present disclosure is a method that includes: providing at a well-site a feed vessel that contains a liquid material, the liquid material including a monomer and an initiator; providing an injection device disposed underneath the feed vessel for directing at least a portion of the liquid material from the feed vessel to a reaction chamber, wherein the reaction chamber includes a fluid; discharging at least a portion of the liquid material from the feed vessel to the reaction chamber through an orifice disposed on the injection device; and forming lost circulation material particulates at least in part by allowing at least a portion of the liquid material to polymerize in the fluid in the reaction chamber.

In one or more embodiments described in the preceding paragraph, the method includes providing a radiation light source emitting an ultraviolet light into the reaction chamber. In one or more embodiments described in the preceding paragraph, the method includes providing a heat source emitting thermal energy into the reaction chamber. In one or more embodiments described in the preceding paragraph, the initiator is selected from the group consisting of a photoinitiator, a thermal initiator, and any combination thereof. In one or more embodiments described in the preceding paragraph, the lost circulation material particulates have a diameter of about 2,000 micrometers or less. In one or more embodiments described in the preceding paragraph, the method includes forming the lost circulation material particulates at a rate from about 1 to about 500 pounds per minute. In one or more embodiments described in the preceding paragraph, the orifice disposed on the injection device has a diameter from about 0.05 to about 2 millimeters. In one or more embodiments described in the preceding paragraph, the method includes transferring the lost circulation material particulates from the reaction chamber to a storage vessel through a conduit; transferring the lost circulation material particulates from the storage vessel to a hopper; and transferring the lost circulation material particulates from the hopper into a mud system. In one or more embodiments described in the preceding paragraph, the method includes adding the lost circulation material particulates to a base fluid to form a treatment fluid.

An embodiment of the present disclosure is a method that includes: providing at a well-site a feed vessel containing a liquid material, the liquid material including a monomer and an initiator; providing an injection device disposed underneath the feed vessel for directing at least a portion of the liquid material from the feed vessel to a belt, wherein the belt moves by running over rollers; discharging at least a portion of the liquid material from the feed vessel to the belt through an orifice disposed on the injection device; forming lost circulation material particulates at least in part by allowing at least a portion of the liquid material to polymerize on the belt; and loosening at least a portion of the lost circulation material particulates from the belt using a detaching device.

In one or more embodiments described in the preceding paragraph, the method includes providing a radiation light source emitting an ultraviolet light onto at least a portion of the belt. In one or more embodiments described in the preceding paragraph, the method includes exposing the liquid material on at least a portion of the belt to the ultraviolet light and allowing the liquid material on at least a portion of the belt to undergo photopolymerization. In one or more embodiments described in the preceding paragraph, the belt includes a coating selected from the group consisting of Teflon, polyethylene, polypropylene, manganese oxide polystyrene, zinc oxide polystyrene, precipitated calcium carbonate, carbon nanotubes, silica nano-coatings, silicone or silane variants, and any combination thereof. In one or more embodiments described in the preceding paragraph, the lost circulation material particulates have at least one geometry selected from the group consisting of a bead, a hollow bead, a sphere, an oval, a fiber, a rod, a pellet, a platelet, a disk, plate, a ribbon, and any combinations thereof. In one or more embodiments described in the preceding paragraph, the injection device moves vertically and horizontally relative to the belt. In one or more embodiments described in the preceding paragraph, the method includes transferring the lost circulation material particulates from the belt to a storage vessel; transferring the lost circulation material particulates from the storage vessel to a hopper; and transferring the lost circulation material particulates from the hopper into a mud system. In one or more embodiments described in the preceding paragraph, the method includes providing a heat source emitting thermal energy onto at least a portion of the belt. In one or more embodiments described in the preceding paragraph, the method includes exposing the liquid material to the thermal energy and allowing the liquid material to undergo thermal polymerization.

An embodiment of the present disclosure is a method that includes: providing at a well-site a feed vessel that contains a liquid material, the liquid material including a monomer and a photoinitiator; providing an injection device disposed underneath the feed vessel for directing at least a portion of the liquid material from the feed vessel to a reaction chamber, wherein the reaction chamber includes a fluid; providing a radiation light source emitting an ultraviolet light into the reaction chamber; discharging at least a portion of the liquid material from the feed vessel to the reaction chamber through an orifice disposed on the injection device; forming lost circulation material particulates at least in part by allowing at least a portion of the liquid material to polymerize in the fluid in the reaction chamber; transferring the lost circulation material particulates from the reaction chamber to a storage vessel through a conduit using an auger screw; transferring the lost circulation material particulates from the storage vessel to a hopper; and transferring the lost circulation material particulates from the hopper into a mud system.

In one or more embodiments described in the preceding paragraph, the lost circulation material particulates have a diameter of about 2,000 micrometers or less.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
  providing at a well-site a feed vessel that contains a liquid material, the liquid material comprising a monomer and an initiator;
  providing an injection device disposed underneath the feed vessel for directing at least a portion of the liquid material from the feed vessel to a reaction chamber, wherein the reaction chamber comprises a fluid;

discharging at least a portion of the liquid material from the feed vessel to the reaction chamber through an orifice disposed on the injection device; and forming lost circulation material particulates by polymerizing at least a portion of the liquid material in the fluid in the reaction chamber.

2. The method of claim 1, further comprising providing a radiation light source emitting an ultraviolet light into the reaction chamber.

3. The method of claim 1, further comprising providing a heat source emitting thermal energy into the reaction chamber.

4. The method of claim 1, wherein the initiator is selected from the group consisting of a photoinitiator, a thermal initiator, and any combination thereof.

5. The method of claim 1, wherein the lost circulation material particulates have a diameter of about 2,000 micrometers or less.

6. The method of claim 1, further comprising forming the lost circulation material particulates at a rate from about 1 to about 500 pounds per minute.

7. The method of claim 1, wherein the orifice disposed on the injection device has a diameter from about 0.05 to about 2 millimeters.

8. The method of claim 1, further comprising:
transferring the lost circulation material particulates from the reaction chamber to a storage vessel through a conduit;
transferring the lost circulation material particulates from the storage vessel to a hopper; and
transferring the lost circulation material particulates from the hopper into a mud system.

9. The method of claim 1, further comprising adding the lost circulation material particulates to a base fluid to form a treatment fluid.

* * * * *